US011866946B2

(12) United States Patent
Elzner et al.

(10) Patent No.: US 11,866,946 B2
(45) Date of Patent: Jan. 9, 2024

(54) METHOD OF ATTACHING MOLDING, TRIP, OR PANELS TO STRUCTURES

(71) Applicants: Robert Dean Elzner, Pocatello, ID (US); Jason Woodland, Pocatello, ID (US)

(72) Inventors: Robert Dean Elzner, Pocatello, ID (US); Jason Woodland, Pocatello, ID (US)

( * ) Notice: Subject to any disclaimer, the term of this patent is extended or adjusted under 35 U.S.C. 154(b) by 0 days.

(21) Appl. No.: 17/893,112

(22) Filed: Aug. 22, 2022

(65) Prior Publication Data

US 2023/0141394 A1 May 11, 2023

Related U.S. Application Data

(63) Continuation of application No. 16/513,248, filed on Jul. 16, 2019, now Pat. No. 11,421,429.

(60) Provisional application No. 62/698,732, filed on Jul. 16, 2018.

(51) Int. Cl.

| | |
|---|---|
| ***E04F 19/02*** | (2006.01) |
| ***E04F 13/08*** | (2006.01) |
| ***G09F 7/00*** | (2006.01) |
| ***E04F 19/06*** | (2006.01) |

(52) U.S. Cl.

CPC .......... *E04F 19/02* (2013.01); *E04F 13/0803* (2013.01); *E04F 13/0894* (2013.01); *E04F 19/06* (2013.01); *G09F 7/00* (2013.01)

(58) Field of Classification Search

CPC ... E04F 13/083; E04F 13/088; E04F 13/0851; E04F 19/02; E04F 13/0803; E04F 13/0894; E04F 19/06; G09F 7/00

See application file for complete search history.

(56) References Cited

U.S. PATENT DOCUMENTS

| | | | |
|---|---|---|---|
| 4,555,432 | A | 11/1985 | Bossons |
| 5,179,811 | A | 1/1993 | Walker et al. |
| 5,359,817 | A | 11/1994 | Fulton |
| 5,819,485 | A | 10/1998 | Lane et al. |

(Continued)

FOREIGN PATENT DOCUMENTS

| | | | |
|---|---|---|---|
| CA | 2254751 | A1 | 7/1999 |
| KR | 100817912 | B1 | 3/2008 |

(Continued)

*Primary Examiner* — Gisele D Ford

(74) *Attorney, Agent, or Firm* — Bryant J. Keller; Kirton McConkie

(57) ABSTRACT

A panel mounting system for mounting building materials to a building surface includes a rigid cleat fixed with the building surface. Multiple building panels each have a cleat depression formed in a rear surface for receiving the cleat. Each edge of the building panel interlocks with an adjacent panel so that all of the building panels hold each other together against the building surface along with the cleat. Some of the building panels may include a hooked flange projecting that engages a flange-receiving groove of an adjacent building panel to mutually secure the building panels together. Some embodiments include a gable rail fixed with the building surface that projecting outwardly to engage a gable rail-receiving slot formed within the rear surface of a trim panel that has an ornate front surface. Other decorative panels may be included for fixing with the trim panels or other of the bundling panels.

20 Claims, 5 Drawing Sheets

(56) References Cited

U.S. PATENT DOCUMENTS

| | | | | |
|---|---|---|---|---|
| 6,134,846 | A | 10/2000 | Lamb | |
| 6,393,779 | B1 | 5/2002 | Boldt | |
| 6,504,098 | B2 | 1/2003 | Seamans | |
| 6,560,944 | B1 | 5/2003 | Wilson | |
| 6,643,987 | B2 | 11/2003 | Rusch | |
| 7,603,824 | B1 | 10/2009 | Hartanto | |
| 8,220,648 | B2 | 7/2012 | Barkdoll et al. | |
| 8,763,312 | B2 | 7/2014 | Carter | |
| 8,813,623 | B2 | 8/2014 | Armacost | |
| 9,260,871 | B2 * | 2/2016 | Shaw | E04F 19/0463 |
| 9,534,402 | B2 | 1/2017 | Shaw | |
| 9,580,918 | B2 | 2/2017 | Armacost | |
| 9,611,659 | B2 | 4/2017 | Baert et al. | |
| 9,611,661 | B2 | 4/2017 | Armacost | |
| 9,945,131 | B2 | 4/2018 | Gosling | |
| 2004/0211144 | A1 | 10/2004 | Stanchfield | |
| 2005/0144881 | A1 | 7/2005 | Tate | |
| 2005/0284072 | A1 | 12/2005 | Andres | |
| 2006/0185299 | A1 | 8/2006 | Poupart | |
| 2007/0017174 | A1 | 1/2007 | Lavell | |
| 2007/0039257 | A1 | 2/2007 | LeBlanc | |
| 2008/0034688 | A1 | 2/2008 | Neuhofer Jr. | |
| 2009/0013636 | A1 | 1/2009 | Wilson | |
| 2009/0071089 | A1 | 3/2009 | Neuhofer | |
| 2009/0094925 | A1 | 4/2009 | Andres et al. | |
| 2009/0151134 | A1 | 6/2009 | Neuhofer | |
| 2010/0018145 | A1 | 1/2010 | Ellis | |
| 2010/0242389 | A1 | 9/2010 | DePaul | |
| 2010/0281798 | A1 | 11/2010 | Sondermann | |
| 2010/0319293 | A1 | 12/2010 | Dammers | |
| 2011/0179733 | A1 | 7/2011 | Picken | |
| 2012/0151850 | A1 | 6/2012 | Cashman | |
| 2013/0047532 | A1 | 2/2013 | Armacost | |
| 2013/0084413 | A1 | 4/2013 | McMahan et al. | |
| 2013/0091791 | A1 | 4/2013 | Hardy | |
| 2014/0093677 | A1 | 4/2014 | Permesang | |
| 2015/0040510 | A1 | 2/2015 | Shaw | |
| 2015/0059271 | A1 | 3/2015 | Tsai | |
| 2015/0197979 | A1 | 7/2015 | Hawk | |
| 2016/0115696 | A1 | 4/2016 | Shaw | |
| 2017/0016235 | A1 * | 1/2017 | Hannig | E04F 15/02033 |
| 2017/0145700 | A1 | 5/2017 | Armacost | |
| 2018/0030739 | A1 | 2/2018 | Meske | |
| 2018/0334809 | A1 * | 11/2018 | Smart | E04F 13/0846 |

FOREIGN PATENT DOCUMENTS

| | | | |
|---|---|---|---|
| KR | 20080113897 | A | 12/2008 |
| KR | 101011782 | B1 | 7/2011 |
| KR | 20120027811 | A | 3/2012 |
| KR | 20130019948 | A | 2/2013 |
| KR | 20130043354 | A | 4/2013 |

* cited by examiner

METHOD OF ATTACHING MOLDING, TRIP, OR PANELS TO STRUCTURES

CROSS-REFERENCE TO RELATED APPLICATIONS

This application is a continuation of prior application Ser. No. 16/513,248, filed Jul. 16, 2019, now U.S. Pat. No. 11,421,429 and claims the benefit of U.S. Provisional Application No. 62/698,732, filed Jul. 16, 2018, which applications are incorporated herein by reference.

BACKGROUND OF THE INVENTION

1. Field of the Invention

This invention relates to panel mounting, and more particularly to an improved system for mounting panels, molding, or trim to structures.

2. Background and Related Art

Applying stucco or other building materials to a building surface requires multiple steps and requires significant equipment and manpower at the jobsite. Obtaining a consistent look on a building in areas where two different contractors work is also often a challenge due to varying skill levels or styles different people. These drawbacks of convention building finishes result in higher costs and longer build times.

Therefore, there is a need for a system that allows for consistent prefabricated building panels to be applied to the building surface quickly and without requiring use of extensive equipment at the jobsite. Such a system would allow for the efficient covering of various types of building surfaces and provide a consistent look around windows, door frames, trim areas, vents, vertical columns, and of course large sides of buildings. The present invention accomplishes these objectives.

BRIEF SUMMARY OF THE INVENTION

The present device is a panel mounting system for mounting building materials to a building surface. Such building materials may take the form of vinyl siding, rock, sand, brick, cement, plaster, stucco, wood, bark, plastic, or the like.

A rigid cleat, preferable made with sheet metal or other rigid material, is fixed with the building surface, such as with mechanical fasteners such as screws, nails or the like. The rigid cleat has at least one extending lip.

A plurality of building panels each preferably has a front surface, a rear surface, a top edge, a bottom edge, a left edge, and a right edge. Each building panel preferably has a cleat depression formed in the rear surface parallel to the bottom edge thereof. The cleat depression has at least one cleat lip resilient deforming and then extending over the cleat depression when becoming fully engaged with the rigid cleat. The building panel is held by the rigid cleat against the building surface. The front surface is adapted for receiving at least partially thereon a coating of the building materials.

The bottom edge of each building panel preferably has an interlocking fit with the top edge of another of the building panels. Similarly, the left edge of each building panel has an interlocking fit with the right edge of another of the building panels. As such, all of the building panels hold each other together against the building surface. The interlocking fit may be a tongue-in-groove type interlocking fit, for example.

Some of the building panels may include a hooked flange projecting away from the front surface proximate the bottom edge thereof. A flange-receiving groove projects away from the front surface of such building panels proximate the top edge thereof. The flange-receiving groove of adjacent building panels cooperate with the hooked flange of another of the building panels to mutually secure the building panels together.

Some embodiments include a gable rail fixed with the building surface that projecting outwardly from the building surface. Corresponding building panels further includes a gable rail-receiving slot formed within the rear surface thereof that is adapted to receive the gable rail to hold the building panel to the building surface. Such a gable rail may include a J-shaped portion at a distal end thereof, such that when inserted into the gable rail-receiving slot of the building panel, the J-shaped portion flexes to catch or bind the gable rail-receiving slot of the building panel to inhibit removal thereof from the building surface.

Some of the building panels take the form of a trim panel that has an ornate front surface. The rear surface of such trim panels include one of the gable rail-receiving slots formed therein for mounting with the gable rail fixed with the building surface.

A keystone cover may be included that has a decorative front surface and a rear side shaped to engage the ornate front surface of the trim panel for fixing thereto with one of the mechanical fasteners, adhesive, or the like. The keystone cover is preferably also coated with the building materials and is made of expanded polystyrene.

The present invention is a system that allows for a consistent prefabricated panel to be applied to the building surface quickly and without requiring use of extensive equipment at a job site. Such a system would allow for the efficient covering of various types of building surfaces and provide a consistent look around windows, door frames, trim areas, vents, vertical columns, and the sides of buildings. Other features and advantages of the present invention will become apparent from the following more detailed description, taken in conjunction with the accompanying drawings, which illustrate, by way of example, the principles of the invention.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1 and 3-5 illustrate a panel mounting system 10 for mounting building materials 20 to a building surface 15. Such building materials 20 may take the form of vinyl siding, rock, sand, brick, cement, plaster, stucco, wood, bark, plastic, closed-cell foam, or the like.

Figure 6:
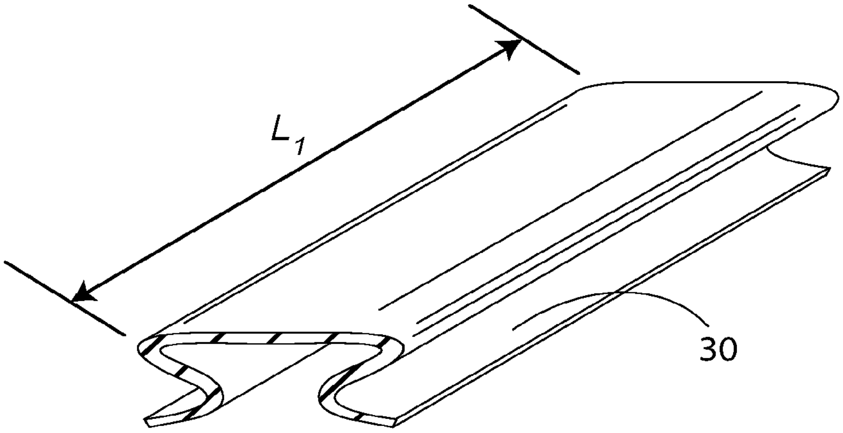
FIG. 6 shows a perspective view of a rigid cleat in accordance with embodiments of the invention.

A rigid cleat 30, preferable made with sheet metal or other rigid material, is fixed with the building surface 15, such as with mechanical fasteners 120 such as screws, nails or the like. The rigid cleat 30 has at least one extending lip 38 and has a length $L_1$ (FIG. 6) of preferably between two feet to ten feet.

A plurality of building panels 40 each preferably has a front surface 42, a rear surface 48, a top edge 41, a bottom edge 49, a left edge 44, and a right edge 46. Each building panel 40 preferably has a cleat depression 50 formed in the rear surface 48 parallel to the bottom edge 49 thereof. The cleat depression 50 has at least one cleat lip 55 resilient deforming and then extending over the cleat depression 50 when becoming fully engaged with the rigid cleat 30. The building panel 40 is held by the rigid cleat 30 against the building surface 15, and is preferably a expanded polystyrene type foam material. The front surface 42 is adapted for receiving at least partially thereon the building materials 20, such as a coating of vinyl, rock, sand, brick, cement, plaster, stucco, wood, bark, plastic, or the like. Each building panel 40 is preferably made with expanded polystyrene, or a like light-weight material.

Figure 3:
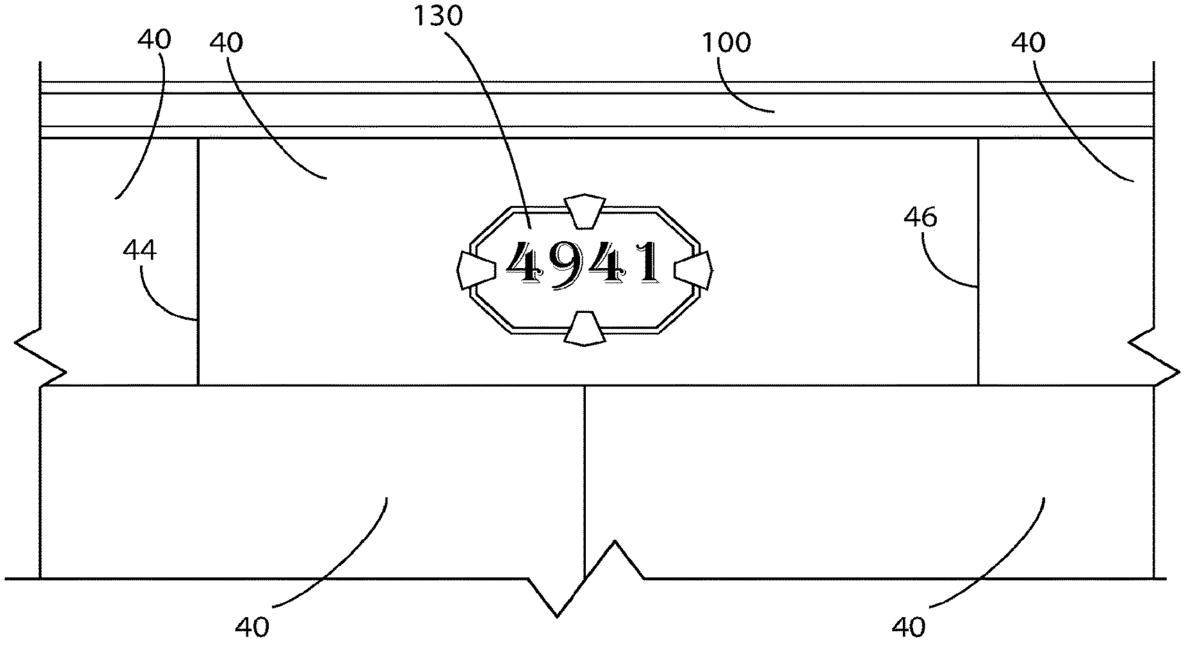
FIG. 3 shows a front elevational view of the invention, illustrating an address plaque panel of embodiments of the invention.
Figure 4:
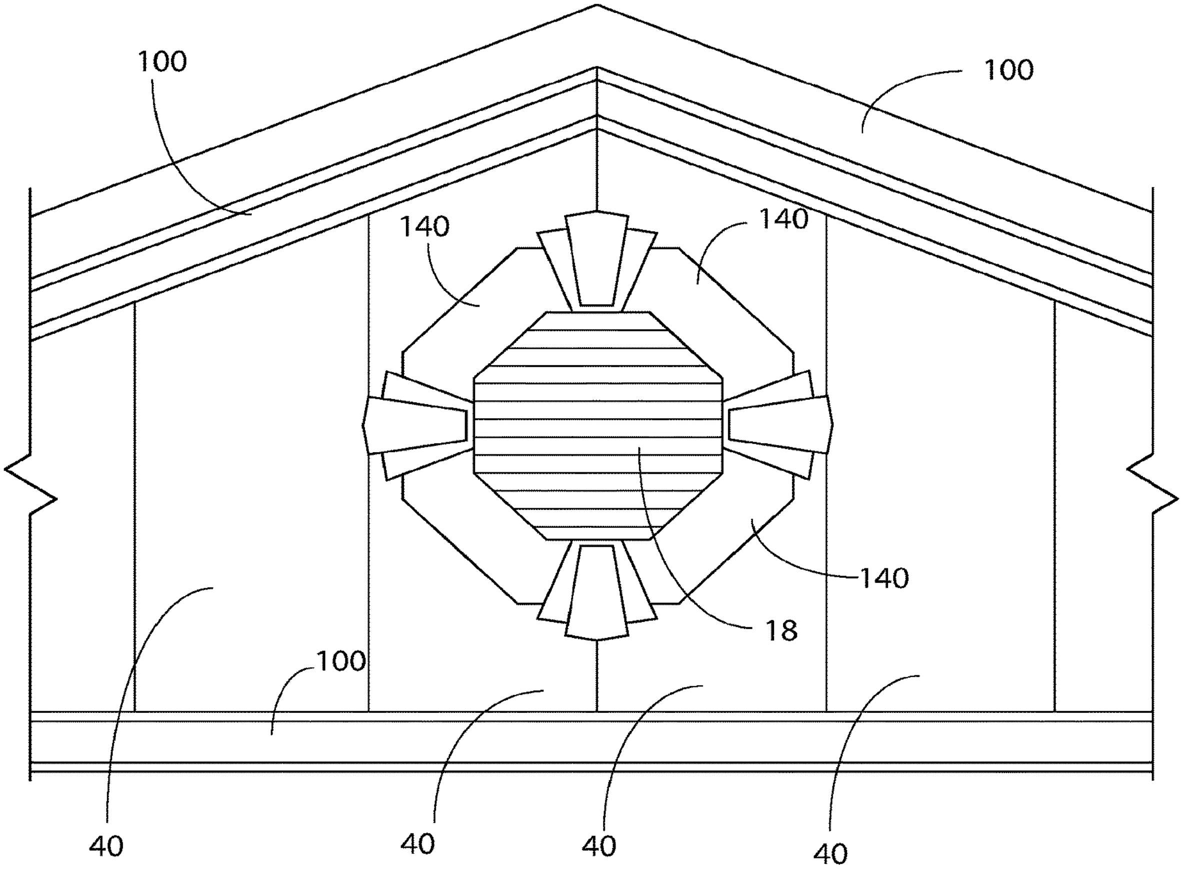
FIG. 4 shows a front elevational view an embodiment of the invention, illustrating vent trim panels of embodiments of the invention trimming a vent feature of the building surface.
Figure 5:
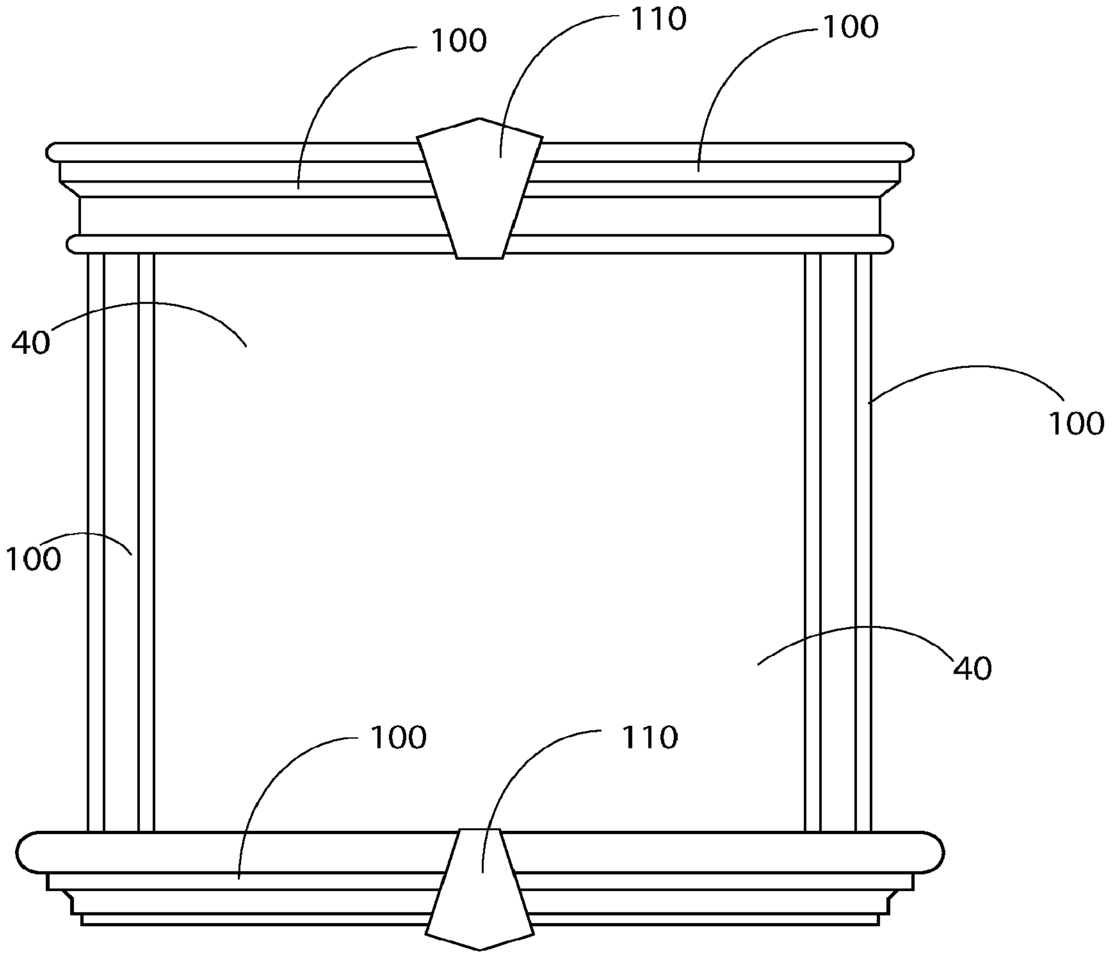
FIG. 5 shows a front elevational view an embodiment of the invention, illustrating a keystone cover option of embodiments of the invention.

The bottom edge 49 of each building panel preferably has an interlocking fit 60 with the top edge 41 of another of the building panels 40. Similarly, the left edge 44 of each building panel 40 has an interlocking fit 60 with the right edge 46 of another of the building panels 40. As such, all of the building panels 40 hold each other together against the building surface 15 (FIG. 3). The interlocking fit 60 may be a tongue-in-groove type interlocking fit 60, for example, or other arrangement as is or becomes known in the art.

Some of the building panels 40 may include a hooked flange 70 (FIG. 1) projecting away from the front surface 42 proximate the bottom edge 49 thereof. A flange-receiving groove 75 projects away from the front surface 42 of such building panels 40 proximate the top edge 41 thereof. The flange-receiving groove 75 of adjacent building panels 40 cooperate with the hooked flange 70 of another of the building panels 40 to mutually secure the building panels 40 together. Preferably the flange-receiving groove 75 includes a forward surface 76 substantially parallel with the front surface 42 of each building panel 40 that can be decorated individually in a trim color, or the like, as desired. Building panels 40 with such a hooked flange 70 and/or flange-receiving groove 75 may or may not include the cleat depression 50, such panels 40 being held to the building surface 15 by each other and not necessarily one of the rigid cleats 30.

Some embodiments include a gable rail 80 fixed with the building surface 15 that projecting outwardly from the building surface 15. Corresponding building panels 40 further includes a gable rail-receiving slot 85 formed within the rear surface 48 thereof that is adapted to receive the gable rail 80 to hold the building panel 40 to the building surface 15. Such a gable rail 80 may include a J-shaped portion 90 at a distal end 88 thereof, such that when inserted into the gable rail-receiving slot 85 of the building panel, the J-shaped portion 90 flexes to catch or bind the gable rail-receiving slot 85 of the building panel 40 to inhibit removal thereof from the building surface 15.

Some of the building panels 40 take the form of a trim panel 100 that has an ornate front surface 108. The rear surface 48 of such trim panels 100 include one of the gable rail-receiving slots 85 formed therein for mounting with the gable rail 80 fixed with the building surface 15.

A keystone cover 110 (FIGS. 1 and 5) may be included that has a decorative front surface 118 and a rear side 108 shaped to engage the ornate front surface 108 of the trim panel 100 for fixing thereto with one of the mechanical fasteners 120, adhesive, or the like. The keystone cover 110 is preferably also coated with the building materials 20 and is made of expanded polystyrene.

Figure 1:
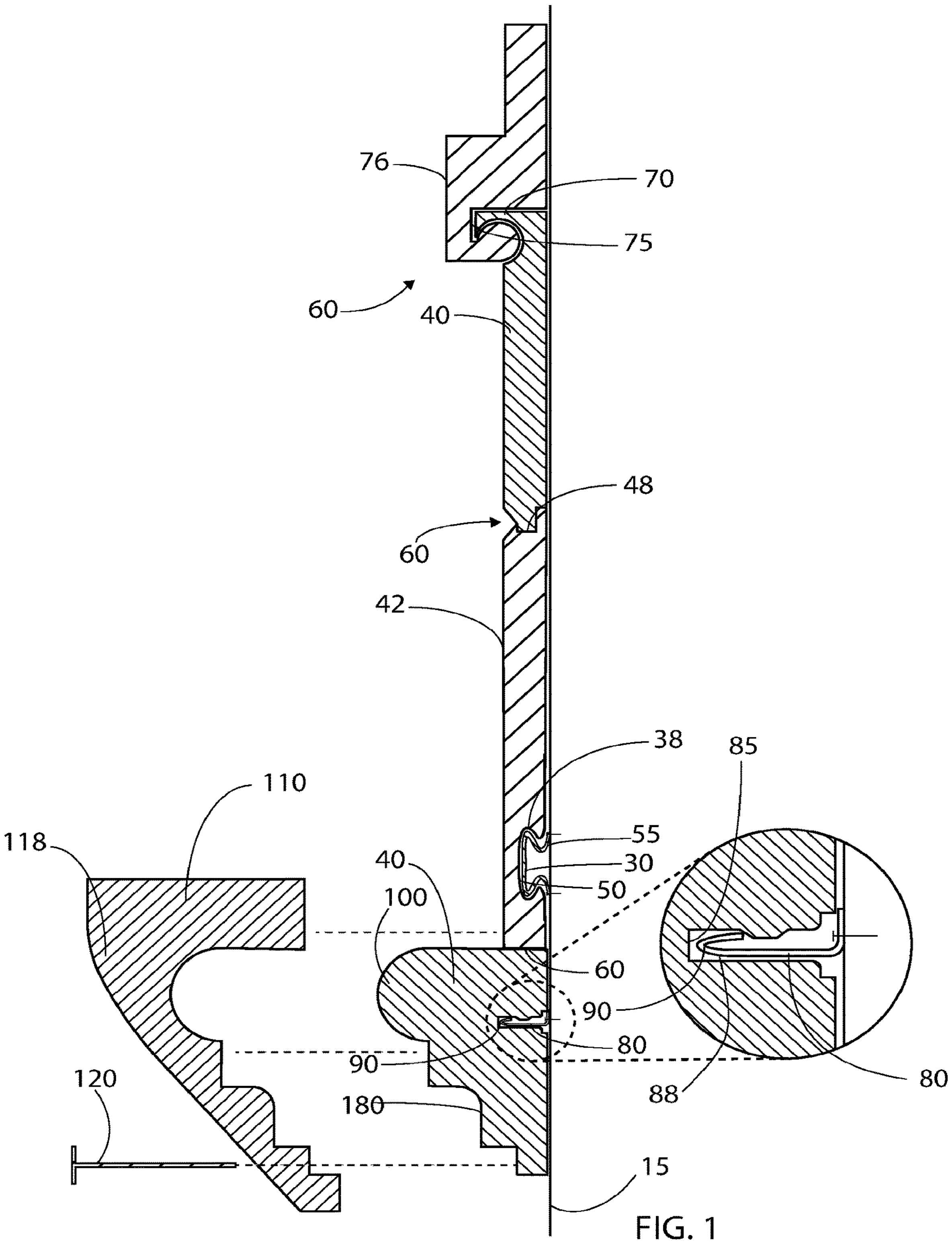
FIG. 1 shows a side cross-sectional view of the invention, showing various building panels of embodiments of the invention fixed with a building surface.
Figure 2:
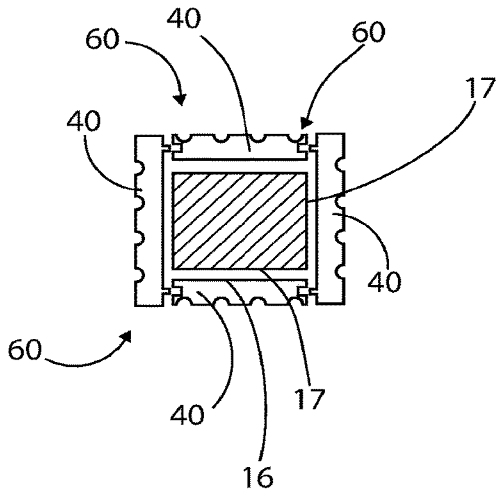
FIG. 2 shows a top plan view of building panels of embodiments of the invention that cooperate to cover four sides of a vertical column.

In cases where the building surface 15 is a vertical column 16 (FIG. 2), the left edge 44 of each building panel 40 has the interlocking fit 60 with the right edge 46 of another of the building panels 40 at an angle of 90-degrees, such that four of the building panels 40 are used to cover four sides 17 of the vertical column 16.

An address plaque panel 130 (FIG. 3) may be included that has a rear side adapted for fitting against the front surface 42 of one of the building panels 40. Such an address plaque panel 130 may be fixed with one of the building panels 40 with the mechanical fasteners 120, adhesive, or the like.

A plurality of vent trim panels 140 (FIG. 4) may be included that engage each other at an angle A greater than zero degrees, such that a vent structure 18 of the building surface 15 can be trimmed with the plurality of vent trim panels 140. While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventors contemplate the various aspects of the invention in any number of claim forms. Accordingly, the inventor reserves the right to add additional claims after filing the application to pursue such additional claim forms for other aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A panel mounting system for mounting building materials to a vertical building surface, the panel mounting system comprising:

a gable rail having a first end that is configured to be fixed to the vertical building surface such that a second end of the gable rail projects away from the vertical building surface; and a building panel comprising expanded polystyrene and having a rear surface and a front surface with a gable rail-receiving slot formed in the rear surface of the building panel, wherein the gable rail-receiving slot comprises a cavity having:

a proximal end that opens from the rear surface of the building panel;

a distal end that is configured to receive the second end of the gable rail; and a catch that is disposed between the proximal end and the distal end of the cavity, and wherein the second end of the gable rail comprises a flange portion that is configured to move to a compressed configuration when the flange portion is forced against the catch of the gable rail-receiving slot and to move to an expanded configuration to secure the building panel to the gable rail when the second end of the gable rail is forced into the distal end of the cavity, past the catch, and wherein an opening of the proximal end of the cavity is wider than both an opening of the distal end of the cavity and a space within the cavity between the catch and an opposing wall to help direct the gable rail into the gable rail-receiving slot.

2. The panel mounting system of claim 1, wherein a left edge of the building panel has an interlocking fit with a right edge of another building panel.

3. The panel mounting system of claim 1, wherein a bottom edge of the building panel has an interlocking fit with a top edge of another building panel.

4. The panel mounting system of claim 1, wherein the front surface of the building panel comprises at least one of a stucco coating, a cement coating, a plaster coating, a brick coating, a rock coating, and a plastic coating.

5. The panel mounting system of claim 1, wherein the catch of the gable rail-receiving slot comprises a protrusion that forms a constricted portion of the cavity.

6. The panel mounting system of claim 5, wherein the flange portion forms a hook-shaped element at the second end of the gable rail, such that an end of the hook-shaped portion of the gable rail is configured to contact the constricted portion of the gable rail-receiving slot to secure the building panel to the vertical building surface.

7. The panel mounting system of claim 1, wherein the gable rail comprises a material having a uniform thickness.

8. The panel mounting system of claim 1, wherein the front surface of the building panel comprises a stucco coating.

9. A panel mounting system for mounting building materials to a vertical building surface, the panel mounting system comprising:

an elongated gable rail having a first end that is configured to be fixed to the vertical building surface such that a second end of the gable rail projects away from the vertical building surface; and building panel comprising expanded polystyrene having a front surface, and a rear surface, with a gable rail-receiving slot formed in the rear surface of the building panel, wherein the gable rail-receiving slot comprises a cavity having:

a proximal end that opens from the rear surface of the building panel;

a distal end that is configured to receive the second end of the gable rail; and a constricted portion that is disposed between the proximal end and the distal end, wherein an opening of the proximal end of the cavity is wider than both an opening of the distal end of the cavity and an opening of the constricted portion to help direct the gable rail into the gable rail-receiving slot, and wherein the second end of the gable rail comprises a resilient hook-shaped member that is configured to flex and deform to a compressed configuration when pressed through the constricted portion of the gable rail-receiving slot and to move to an expanded configuration to lock the building panel to the gable rail when the second end of the gable rail is forced into the distal end of the cavity.

10. The panel mounting system of claim 9, wherein a left edge of the building panel has an interlocking fit with a right edge of another building panel.

11. The panel mounting system of claim 9, wherein a bottom edge of the building panel has an interlocking fit with a top edge of another building panel.

12. The panel mounting system of claim 9, wherein the front surface of the building panel comprises at least one of vinyl, rock, sand, brick, cement, plaster, stucco, wood, bark, and plastic.

13. The panel mounting system of claim 9, wherein the front surface of the building panel comprises a stucco coating.

14. The panel mounting system of claim 9, wherein the first end of the gable rail has a L-shaped portion having a flat surface that is configured to be fastened to, and to abut, the vertical building surface.

15. The panel mounting system of claim 9, wherein the opening of the proximal end of the cavity progressively narrows in a distal direction until the opening of the proximal end of the cavity meets the constricted portion of the cavity.

16. A panel mounting system for mounting building materials to a vertical building surface, the panel mounting system comprising:

an elongated gable rail configured to be fixed to the vertical building surface such that a second end of the gable rail projects away from the vertical building surface; and building panel comprising expanded polystyrene having a front surface coated with stucco and a rear surface, with a gable rail-receiving slot formed in the rear surface of the building panel, wherein the gable rail-receiving slot comprises a cavity having:

a proximal end that opens from the rear surface of the building panel;

a distal end that is configured to receive the second end of the gable rail; and a constricted portion that is disposed between the proximal end and the distal end, wherein an opening of the proximal end of the cavity is wider than both an opening of the distal end of the cavity and an opening of the constricted portion to help direct the gable rail into the gable rail-receiving slot, and wherein the second end of the gable rail comprises a resilient hook-shaped member that is configured to flex and deform to a compressed configuration when pressed through the constricted portion of the gable rail-receiving slot and to move to an expanded configuration to make contact with the constricted portion and secure the building panel to the gable rail when the second end of the gable rail is forced into the distal end of the cavity.

17. The panel mounting system of claim 16, wherein a left edge of the building panel comprising the expanded polystyrene has an interlocking fit with a right edge of another building panel.

18. The panel mounting system of claim 16, wherein a bottom edge of the building panel comprising the expanded polystyrene has an interlocking fit with a top edge of another building panel.

19. The panel mounting system of claim 16, wherein the opening of the proximal end of the gable rail-receiving slot narrows in a distal direction until it meets the constricted portion.

20. The panel mounting system of claim 19, wherein the first end of the gable rail has a L-shaped portion having a flat surface that is configured to be fastened to, and to abut, the vertical building surface, wherein the gable rail comprises a material having a uniform thickness, and wherein the opening of the proximal end of the cavity progressively narrows in a distal direction until the opening of the proximal end of the cavity meets the constricted portion of the cavity.

* * * * *